2,342,126

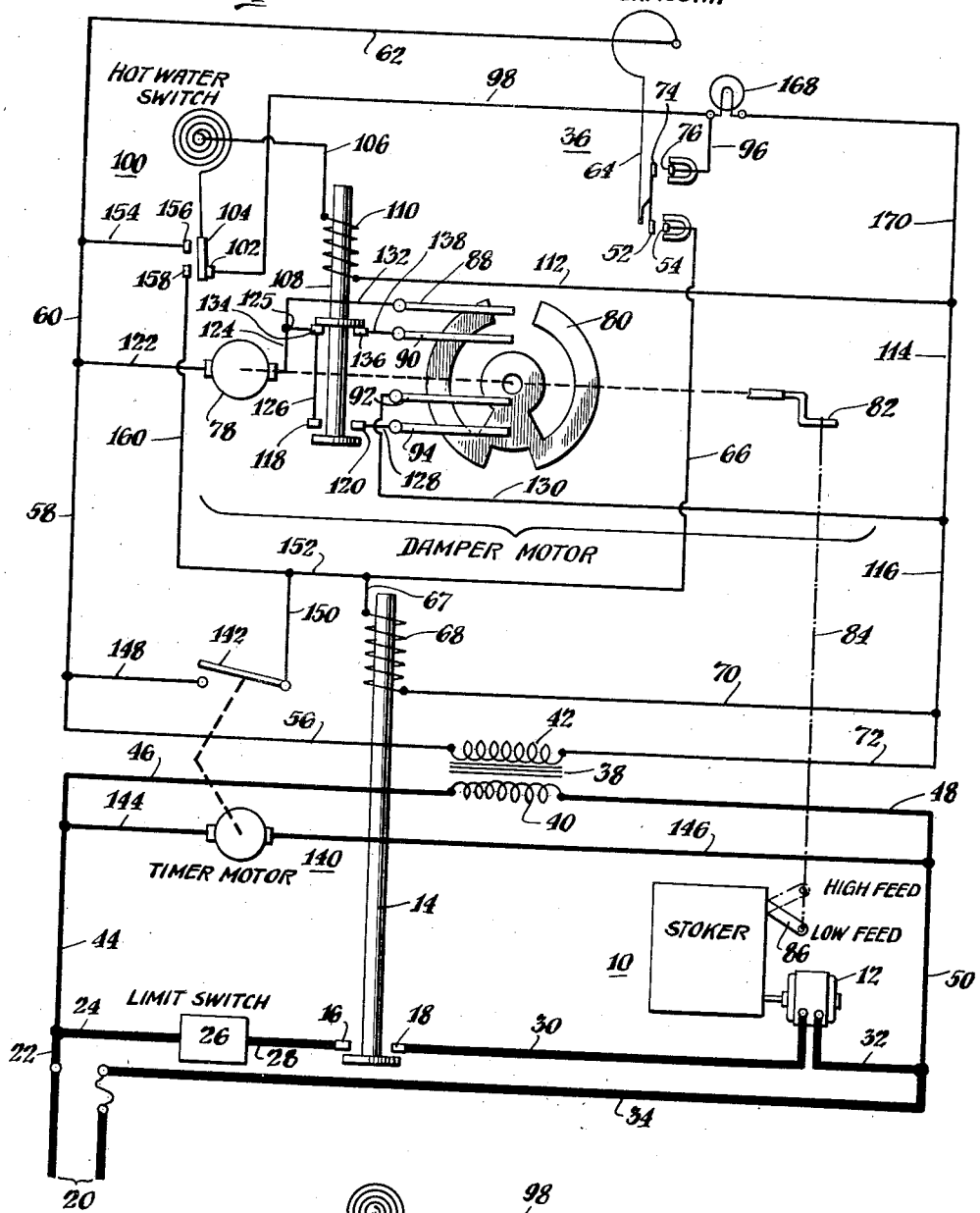
Feb. 22, 1944.  C. H. DICKE  2,342,126
FURNACE CONTROL SYSTEM
Filed June 1, 1940
INVENTOR
Carl H. Dicke Patented Feb. 22, 1944

UNITED STATES PATENT OFFICE 2,342,126

FURNACE CONTROL SYSTEM

Carl H. Dicke, Dayton, Ohio, assignor to The Master Electric Company, a corporation of Ohio Application June 1, 1940, Serial No. 338,319

4 Claims. (Cl. 236—9)

This invention relates to a furnace control system, and more particularly to a stoker control system.

An object of this invention is to provide a furnace control system which simply and readily maintains a substantially constant predetermined desired temperature.

A further object of this invention is to provide a stoker control system which automatically controls the rate of fuel feed in accordance with the temperature of the space to be heated.

A further object of this invention is to provide a furnace control system which will automatically control a furnace to maintain a proper minimum temperature in all times of weather and during all seasons of the year.

A still further object of this invention is to include a hot water control system used with and correlated to a comprehensive all-year furnace control system.

A more specific object of this invention is the provision of a furnace control system which will operate to provide a high rate of fuel feed when the temperature of the space to be controlled is lower than a predetermined norm, to provide a low rate of fuel feed when the temperature is only slightly lower than the predetermined norm, and to cut out the fuel feed when the normal temperature has been reached except for a periodic operation to prevent extinguishment of the furnace fire.

These and other features, capabilities and advantages of the invention will appear from the subjoined detail description of one embodiment and a modification thereof, illustrated in the accompanying drawing in which:

Fig. 1 is a circuit diagram of a preferred arrangement of the system in accordance with the present invention, illustrated with a diagrammatically indicated stoker control mechanism; and Fig. 2 is a partial circuit diagram illustrating a modified control arrangement.

As shown in Fig. 1, the invention relates to the control of a furnace stoker 10, powered by an electric motor 12, the energization of which is effected by the closure of a switch 14 having normally open contacts 16 and 18. Closure of the switch 14 provides an energizing circuit for the motor 12 which may be traced from one side of the source of power 20, conductors 22 and 24, the usual safety limit switch diagrammatically indicated at 26, conductor 28, closed contacts 16 and 18 of the switch 14, conductor 30, the motor 12 and conductors 32 and 34 to the other side of the line. Energization of the motor 12 drives the stoker mechanism to supply fuel to the furnace at either a high rate of feed or a low rate of feed, as will be more fully explained below.

As in most furnace control systems, the primary control is effected by some temperature-responsive means such, as shown by way of example in the present case, a room thermostat 36. I prefer that the control circuit, the energization of which is effected by the room thermostat, be a low voltage circuit, and for this purpose there is provided a suitable transformer 38 having a primary winding 40 connected to the main source of power, and a secondary winding 42 providing power for the control apparatus. The energization of the transformer 38 may be traced through a circuit beginning with one side of the source of power 20, conductors 22, 44 and 46, the primary winding 40 and conductors 48, 50 and 34 to the other side of line.

The room thermostat 36 to be used in the control system of the present invention is preferably provided with two pairs of contacts, one pair of which, namely 52, 54 when closed, complete a circuit effective to close the switch 14 and thus energize the motor 12 for actuation of the stoker mechanism. This circuit may be traced from one side of the energized secondary transformer winding 42, conductors 56, 58, 60 and 62, the thermostat arm 64, contacts 52 and 54, conductors 66 and 67, winding 68 of the switch 14, and conductors 70 and 72 to the other side of the transformer.

The room thermostat is also provided with a second pair of contacts 74, 76 which are adapted to energize a circuit for a damper motor 78, provided with a circuit commutating device 80 and a crank arm 82. The latter, in turn, through suitable means such as a chain or cable 84 moves a control lever 86 on the stoker from its normally low feed position to a high feed position. Associated with the damper motor driven commutator 80 are a plurality of contacting brushes 88, 90, 92 and 94, for the purpose of commutating the various control circuits. Upon closure of the contacts 74, 76 a circuit may be traced from one side of the energized transformer secondary winding 42, conductors 56, 58, 60 and 62, arm 64 of the thermostat, contacts 74, 76, conductors 96 and 98, a hot water switch 100 having a stationary contact 102 normally contacted by the thermostatically operated switch arm 104, conductor 106, the energizing coil 110 of a control switch 108, and conductors 112, 114, 116 and 72 to the other side of the transformer winding. Energization of the coil 110 of the switch 108 raises the switch armature to bridge contacts 118 and 120, thereby completing an energizing circuit for the damper motor 78. This circuit will be traced from one side of the energized transformer secondary winding 42, to conductors 56, 58 and 122, the motor 78, conductors 124, 125 and 126, closed contacts 118, 120, conductor 128, brush 94, commutator 80, brush 92 and conductors 130, 116 and 72 to the other side of the transformer secondary winding. The damper motor 78 will then begin to rotate to raise the stoker control lever from the low feed to the high feed position. The circuit for the damper motor is maintained as just traced until the brush 94 meets an open portion of the commutator. The damper motor circuit would, at this point be broken except for the fact that substantially simultaneously the brush 88 comes into contact with the commutator segment so that the circuit for the damper motor instead of being traced to the brush 92 through conductors 125, 126, closed contacts 118, 120, conductor 128 and brush 94, will now be completed through conductor 132 to the brush 88. This transfer of control permits the damper motor to run until the brush 88 meets the outer cut-out portion of the commutator, corresponding to the raised position of the crank 82 and the high feed position of the stoker lever 86, at which time the damper motor will accordingly stop.

It will be clear to those skilled in this art that when the circuit formed by the contacts 74, 76 of the room thermostat is broken, the circuit for the switch coil 110 will become de-energized and this switch will return to the position shown in the drawing. In this position of the switch a circuit is established for again rotating the damper motor to return it and the stoker control lever to their original low-feed position. This circuit may be traced from one side of the energized transformer secondary winding 42, conductors 56, 58 and 122, the motor 78, conductors 124 and 125, closed contacts 134, 136, conductor 138, brush 90, commutator segment 80, brush 92, and then to the other side of the transformer winding as previously traced. Again, after the motor has travelled a predetermined distance, the brush 90 will travel on to a cut-out portion of the commutator, at which time again, however, the brush 88 will be in contact with the commutator and the circuit for the damper motor is completed through this brush and the brush 92 until the brush 88 meets the oppositely positioned outer cut-out portion of the commutator, which will correspond to the lower position of the arm 82 and the low feed position of the stoker motor control lever 86.

In connection with the above described operation of the stoker control by the room thermostat, it is pointed out that in practice the contacts 52, 54 of the thermostat are positioned in such a manner that they will close prior to the contacts 74, 76, with a difference in temperature of closure of, for example, 2°. Assuming, by way of illustration, that the room thermostat is set to maintain a temperature of 71°, if the temperature drops to 70°, the contacts 52 and 54 will close to start the stoker motor in the low feed position. If, however, the temperature of the room drops still further to 69° the contacts 74, 76 will also close and will so actuate the damper motor as to change the feed from low to high. In this manner, a close regulation of the temperature of the room is attained, without, furthermore, the danger of overheating. As the room becomes warmer it will also be clear that the contacts 74, 76 will first separate, changing the control from a high feed to a low feed, and then if the temperature of the room increases still further, the contacts 52, 54 will open to stop the fuel feed altogether.

In order to prevent extinguishment of the fire during the summer months when the room thermostat may not call for fuel for long periods of time, there is also preferably provided a timer motor 140 which periodically opens and closes a timer switch 142. The timer motor 140 is connected directly across the main source of power, and the circuit therefore may be traced from one side of the source of power 20, conductors 22, 44 and 144, motor 140, and conductors 146, 50 and 34 to the other side of the line. Closure of the switch 142 by the timer motor 140 completes an energizing circuit for the coil 68 of the stoker motor switch 14. This energizing circuit may be traced from one side of the energized transformer secondary winding 42, conductors 56 and 148, closed switch 142, conductors 150, 152 and 67, the coil 68, and conductors 70 and 72 to the other side of the winding. It will be noted that the switch 142 merely closes the energizing switch for the stoker motor which is in the normally low feed position. In other words, a high feed is not necessary for intermittent summer operation. Of course, if the room thermostat is calling for heat either at a low feed or a high feed, closure of the switch 142 will have no effect.

The furnace control system of the present invention lends itself to correlation with a hot water control. During normal operation of the furnace the boiler will normally provide sufficient hot water to meet general requirements. However, during the summer months or if an extra large amount of hot water has been used, it is desirable to provide such hot water as quickly as possible. For this purpose, the hot water temperature-responsive switch 100 has been interconnected with the furnace control system in the manner illustrated in Fig. 1. Normally, the hot water switch is in such a position to bias the switch arm 104 against the contact 102, thus maintaining a circuit by means of which the contacts 74, 76 of the room thermostat 36 can energize the control switch 108 to provide a high fuel feed for the furnace. If, however, the temperature of the boiler decreases below a predetermined minimum, the switch arm 104 will move over and shut the contacts 156, 158. This produces two effective circuits. In the first place, the coil 68 will be energized to raise the stoker motor switch 14 and thereby start the supply of fuel to the furnace. This circuit may be traced from one side of the energized secondary winding 42 of the transformer, to conductors 56, 58, 60 and 154, contact 156, arm 104 and contact 158 of the hot water switch, conductors 160, 152 and 67, coil 68 and conductors 70 and 72 to the other side of the transformer secondary. At the same time, another circuit will be established from contact 156 to arm 104 of the hot water switch, conductor 106, energizing coil 110 of the control switch 108, and conductors 112, 114, 116 and 72 to the transformer secondary. Energization of the coil 110 starts the damper motor to move the stoker control lever 86 to the high feed position. In this manner, the water in the boiler is heated quickly and efficiently, and because the stoker is immediately put into the high feed position, the stoker need only be operated for a relatively short period of time for the attainment of the desired water temperature.

A slight modification of the water heating control is illustrated in Fig. 2, and is used where a slow heating of the boiler water appears desirable. In this case, the circuit to the control winding 110 of the relay 108 is completed through a pair of contacts 102, 164 on the hot water switch, the conductor 166 in this case replacing the conductor 106 of Fig. 1. Now when the hot water switch 100' moves to shunt the contacts 156, 158 the circuit to the switch coil 110 is entirely broken and the stoker motor is energized only in its normal low feed position.

It is not necessary, but desirable, that the room thermostat be provided with an indicating and heating lamp such as the lamp 168. It will be noted that this lamp will be lighted only when the contacts 74, 76 are closed, in other words, when the thermostat calls for a high rate of feed. In this case, the circuit for the lamp 158 may be traced from one side of the secondary transformer winding 42, conductors 56, 58, 60 and 62, arm 64 and contacts 74 and 76 of the thermostat, conductor 96, lamp 168, and conductors 170, 114, 116 and 72 to the other side of the winding.

It is to be clearly understood that while the control system described above is a preferred embodiment of applicant's invention, such invention is not intended to be limited to the exact apparatus illustrated and described. For example, the details of the stoker control mechanism are unimportant, so long as it is possible to secure a relatively high and a relatively low feed. The switches which have been illustrated are merely diagrammatic and can obviously be replaced by similarly functioning switches well known to the art. Instead of a single room thermostat having two pairs of contacts, it will be clear that a pair of thermostats could be used in place thereof. While a difference in operating temperature of about 2° is suggested between the closing of the two thermostat switches, this may be changed to a greater or a lesser extent depending upon the control desired.

Additionally, it is pointed out that the room temperature-responsive stoker control system can be used independently of the control of the hot water and independently of the periodically operated switch.

Without further analysis, the foregoing will so fully reveal the gist of this invention that others can by applying current knowledge readily adapt if for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In combination, a thermostat located at some point at which it is desired to regulate the temperature of the air, a furnace for the purpose of supplying heat to the point of which the thermostat is located, means for feeding fuel to said furnace at a predetermined relatively high rate and a predetermined relatively low rate, means dependent upon the position of said thermostat for disconnecting said fuel feeding means for actuating said fuel feeding means at one or the other feeding rate, a water boiler heated by said furnace, and means responsive to a predetermined low temperature in said boiler for actuating said fuel feeding means at the high rate irrespective of the position of said thermostat.

2. In combination, a thermostat located at some point at which it is desired to regulate the temperature of the air, a furnace for the purpose of supplying heat to the point at which the thermostat is located, electrically operated means for feeding solid fuel to said furnace at a predetermined relatively high rate and a predetermined relatively low rate, means dependent upon the position of said thermostat for disconnecting said fuel feeding means or actuating said fuel feeding means at one or the other feeding rates, and means operable at and for predetermined intervals of time for actuating said fuel feeding means at low rate, unless said thermostat is in the high rate position, in combination with a water boiler heated by said furnace, and means responsive to a predetermined low temperature of the water in said boiler for actuating said fuel feeding means at the high rate irrespective of the position of said thermostat or of said time-responsive means.

3. In combination, a pair of thermal-responsive switches located at some point at which it is desired to regulate the temperature of the air, one of which is adapted to close at a first predetermined temperature and the other of which is adapted to close at another predetermined temperature as well as at said first predetermined temperature, a furnace for the purpose of supplying heat to the point at which the thermal-responsive switches are located, an adjustable fuel-feeding device for said furnace, a first motor for driving said fuel-feeding device, a second motor for adjusting said fuel-feeding device to either a low or a high rate of feed, a source of power, control circuits connecting said motors to said source of power upon closure of said other switch for driving said fuel-feeding device and adjusting said fuel-feeding device to the low feed position, means responsive to the closure of said one switch for energizing said second motor to adjust said fuel-feeding device to the high feed position, and means periodically connecting said motors to said source of power to drive said fuel-feeding device in low feed position for maintaining the fire in said furnace, said last means including a third switch connected in shunt to said other switch, and means for periodically operating said third switch.

4. In combination, a pair of thermal-responsive switches located at some point at which it is desired to regulate the temperature of the air, one of which is adapted to close at a first predetermined temperature and the other of which is adapted to close at another predetermined temperature as well as at said first predetermined temperature, a furnace for the purpose of supplying heat to the point at which the thermal-responsive switches are located, an adjustable fuel-feeding device for said furnace, a first motor for driving said fuel-feeding device, a second motor for adjusting said fuel feeding device to either a low or a high rate of feed, a source of power, control circuits connecting said motors to said source of power upon closure of said other switch for driving said fuel-feeding device and adjusting said fuel-feeding device to the low feed position, means responsive to the closure of said one switch for energizing said second motor to adjust said fuel-feeding device to the high feed position, a boiler heated by said furnace, and a switch responsive to the temperature of the boiler adapted when closed to shunt both of said thermal-responsive switches.

CARL H. DICKE.